United States Patent Office 2,970,068
Patented Jan. 31, 1961

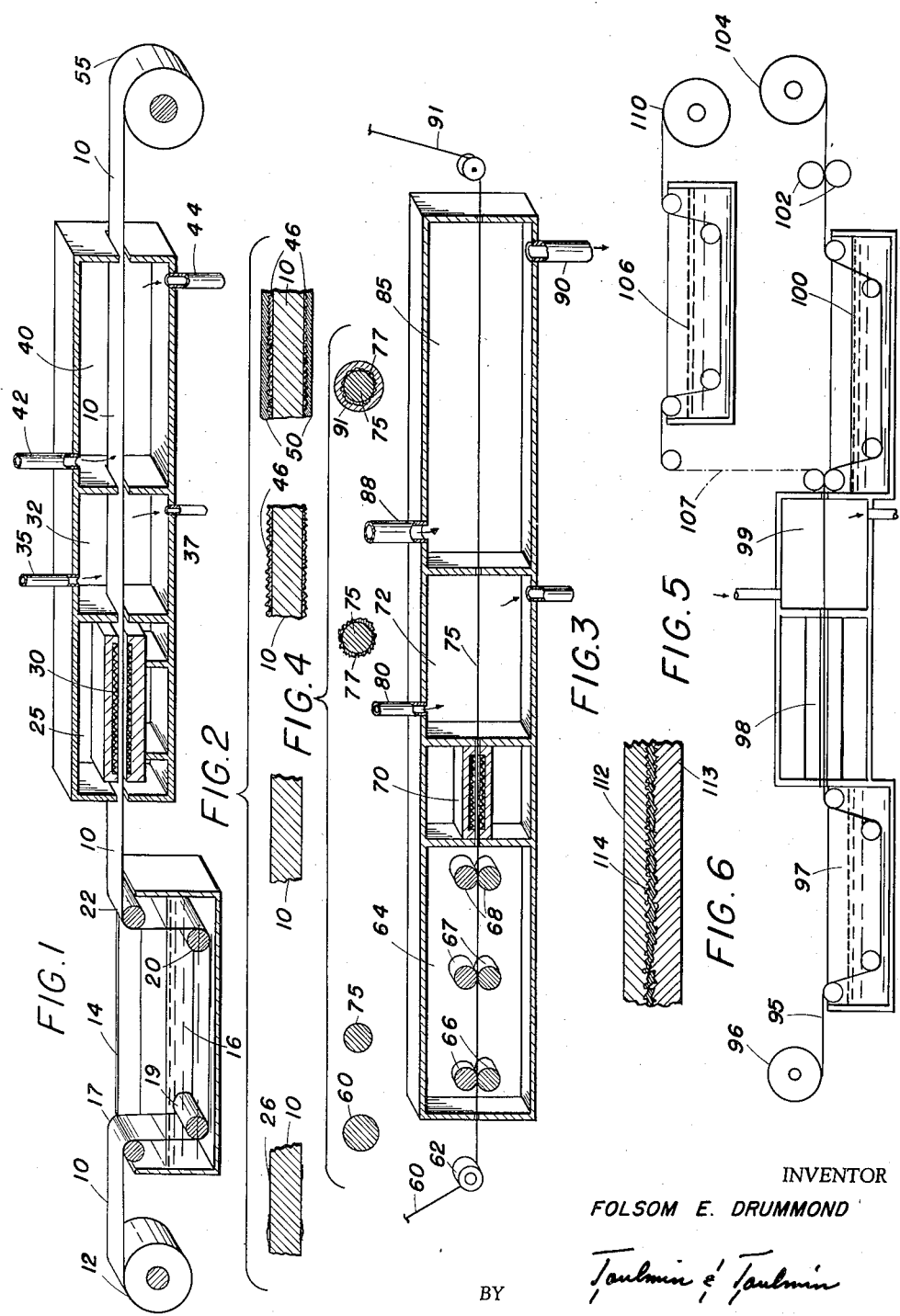

2,970,068

METHOD OF MAKING A COMPOSITE STOCK

Folsom E. Drummond, Washington, D.C., assignor, by mesne assignments, to Union Carbide Corporation, New York, N.Y., a corporation of New York Filed Mar. 7, 1955, Ser. No. 492,706

2 Claims. (Cl. 117—71)

This invention relates to methods for making such products, the invention being particularly concerned with the production of composite metal articles wherein aluminum metal is supported and bonded to a metal, for example, steel, tin or the like metal, with which it does not form a good bond.

It has been difficult heretofore to produce a satisfactory composite article of aluminum and steel or tin and aluminum. This is because the inner facial alloy formed is very hard and brittle and there is a tendency to form areas wherein the bond is weak. The presence of this brittle interfacial layer and weak-bonded areas results in a product which is commercially unsatisfactory.

The present invention overcomes the above mentioned difficulties, for all practical purposes, and provides a composite aluminum-metal article which does not have a brittle bonding alloy layer formed between the aluminum and the other metal.

It is an object of this invention, therefore, to provide a composite aluminum-metal product wherein the aluminum is applied to metal, e.g. steel, iron, tin or equivalent metals, in such a manner as to preclude the formation of a brittle intermediate bonding layer.

It is a further object of the invention to provide a composite metal product which may be useful in preparing anti-friction articles such as bearings or friction type products, e.g. clutch plates, and etc., which provides for bonding aluminum metal to steel through an intermediate metal bonding layer.

Another object of the invention is to produce composite metal wire, particularly aluminum conductor wire, and which may be provided with a tinned surface.

Another object of the invention is to produce aluminized steel sheet or wire wherein the aluminum metal is bonded to the steel through an intermediate porous metal layer which is ductile and forms a tooth-like surface for the reception of aluminum.

A still further object of the invention is to provide an improved method of bonding aluminum to steel by depositing a bonding metal onto the surface of the steel by gaseous metal deposition to form an intermediate metal layer engaging in the pores of the steel, and which layer interlocks with the aluminum metal applied thereover. The intermediate metal layer, which is deposited by gaseous metal deposition, enters into the pores and diffuses into the steel, forming a strong, tenaceous, interlocked bonding layer between the aluminum and the steel. A novel composite aluminum steel product results.

Further objects and advantages of the invention will be apparent from the following description taken in connection with the accompanying drawings wherein preferred embodiments of the invention are illustrated.

In the drawings:

Figure 1 illustrates diagrammatically one method and apparatus for aluminizing sheet steel according to this invention;

Figure 2 illustrates in fragmentary sectional views and on enlarged scale the condition of the sheet metal during the various stages of treatment as it passes along through the cleaning and plating apparatus;

Figure 3 is a similar diagrammatic view illustrating a method and apparatus arrangement for producing composite wire;

Figure 4 is a like fragmentary sectional view as in Figure 2 and illustrating diagrammatically the condition of the wire as it is being processed;

Figure 5 illustrates diagrammatically a modified method and apparatus for producing composite metal products wherein aluminum metal is applied and bonded to steel or the like metal utilizing either electrolytically deposited aluminum or molten aluminum; and Figure 6 is a view on an enlarged scale and in fragmentary cross section a composite stock wherein tin is bonded to aluminum.

In accordance with the present invention, aluminum is bonded to a metal to which it is difficult to bond by employing an intermediate layer which is plated thereon by gaseous metal deposition. In this manner, a thin porous metal coating is deposited on the base metal by gaseous metal decomposition, for example, using a gaseous metal carbonyl, which porous layers serves to provide a toothed surface to which the aluminum metal interlocks to form a composite product. For this purpose an intermediate layer of copper, nickel, iron or alloys thereof, e.g. copper-nickel, copper-iron, copper-tin or the like metal, which will form a satisfactory porous or toothed layer may be used. Details of bonding metal deposits of this character will be found in the U.S. patent of Fink, 2,475,601, and assigned to the assignee of the present invention.

Referring to the drawings, there is illustrated in Figure 1 schematically a method and apparatus for aluminizing steel strip as a continuous process. In the drawings, a steel strip 10 is drawn from a storage roll 12 and passed through a cleaning tank 14 which contains cleaning fluid 16 for cleaning the metal. The strip 10 is immersed in the cleaning fluid by drawing the same over roll 17 and beneath the rolls 19 and 20, and upwardly and out of the cleaning tank over roll 22. The chemically clean strip, which is then freed of cleaning fluid in any suitable manner, as by rinsing in water, is passed to a heating and gaseous metal plating chamber 25. The cleaning tank 14 may comprise suitable chemicals, e.g. alkali phosphate, phosphoric acid or pickling acid to clean the strip and remove foreign matter, such as indicated at 26 in Figure 2.

If desired, electro-chemical cleaning methods may be employed, as by making the strip the anode in an aqueous alkaline bath. Sand blasting may also be employed. The particular cleaning treatment employed in each case is governed by the metal being treated and its physical condition.

The clean metal strip 10 is heated by passing the same between heating coils 30 to raise the temperature of the strip sufficiently to decompose the heat decomposable metal compound used to effect the gaseous metal plating in chamber 32. After pre-heating the strip while maintained out of direct contact with air or atmospheric conditions conducive to oxidation, the strip is moved along into the gaseous metal plating chamber 32. In chamber 32 a metal coating is applied by circulating a decomposable gaseous metal compound against the hot strip. A coating of nickel, copper, iron or suitable alloy thereof is thus deposited by gaseous metal deposition.

The gaseous metal is conducted to the chamber 32 through a conduit 35 and waste gases withdrawn therefrom by an exhaust conduit 37. Plating is effected employing nickel carbonyl; however, other metal carbonyls, e.g. copper, iron, tin or alloys thereof or other suitable heat-decomposable metal compounds may be used. The deposit of metal is preferably on the order of 0.0001 to 0.0005 inch but metal coatings of greater or less thickness may be utilized, if desired.

After application of the intermediate metal bonding coating by gaseous metal deposition, the metal strip is moved along through the plating chamber 40 and aluminum metal is applied thereon. The metal coating of aluminum may be buffed, and if desired, a lacquer coating applied thereover. Aluminum metal may be deposited on the intermediate metal coating by gaseous metal deposition, similarly as effected in chamber 32 of Figure 1, and utilizing a gaseous heat decomposable metal compound. Gaseous aluminum metal is admitted to the plating chamber 40 through the conduit 42 and exit gases withdrawn through conduit 44. Heat decomposable compounds of aluminum, which may be used to deposit aluminum metal, are for example aluminum di- or triethyl or methyl, also aluminum hydride. The plating is preferably carried out in a nonoxidizing atmosphere to avoid the formation of oxides. A relatively thick aluminum metal coating is applied, preferably of a thickness of 0.01 to 0.03 inch.

The intermediate metal bonding coating as deposited in gaseous metal plating chambers 32, consists of a thin porous coating having a sandpaper like surface, as illustrated at 46 in Figure 2, the coating providing a tooth-like structure for the reception of the aluminum metal, as indicated at 50. Aluminum metal is thus tenaceously bonded to the steel backing strip through the intermediate gaseous metal deposited layer. The finished composite metal strip is withdrawn from the chamber 40 and rolled up on the storage roll 55.

In Figure 3, there is illustrated schematically a similar apparatus and method for making a composite wire of aluminized steel. As shown, a steel wire 60, is moved through the chamber or compartment 64, the wire being cold drawn to the desired gauge by the sets of rolls 66, 67 and 68. The wire 60 then passes through a chamber 70 where it is heated to a temperature sufficient to remove any moisture and high enough to decompose a gaseous metal compound used in the adjacent gaseous metal plating chamber 72. The heated wire is then moved along as at 75 while subjected to gaseous metal plating in chamber 72, the same being coated with copper. For this purpose gaseous copper carbonyl is introduced into chamber 72. A porous metal deposit of copper is produced as illustrated at 77 in Figure 4. Gaseous metal carbonyl is introduced through the conduit 80 along the inert carrier gas, e.g. carbon dioxide, and circulated in contact with the heated wire 75 to bring about the gaseous metal deposition. Nickel may be deposited by employing nickel carbonyl in place of copper carbonyl. Suitable mixtures of the different metal carbonyls or like heat-decomposable compounds may be used to produce alloy deposits.

The wire comprising the intermediate metal bonding coating of copper, nickel or the like to which aluminum may be readily bonded, is then introduced into the plating chamber 85 wherein the wire is subjected to aluminum metal plating, the aluminum metal compound in gaseous form being admitted to the chamber 85 through conduit 88 to contact the wire. Waste gases are drawn off through conduit 90. Finished aluminum-steel wire, such as shown at the right in Figure 4, consists of a core of steel 75 and an intermediate bonding layer of copper or alloy 77 and an outer coating 91 of aluminum.

In the modification shown in Figure 5, a metal strip or wire 95 of iron or steel is aluminized, the wire being drawn from the roll 96 and passed through the cleaning bath 97 and thence through a heating chamber 98 for preheating the metal to a temperature to decompose the gaseous metal compound admitted to the plating chamber 99. Gaseous metal plating is effected in chamber 99, similarly as heretofore described, to provide the wire with a bonded metal layer of wire, e.g. utilizing iron carbonyl. After applying the flash coating of iron, which is preferably of a thickness of approximately 0.0005 inch and porous, the thus coated wire is conducted through a molten aluminum bath, as indicated at 100, and thence between the wiping rolls 102 and to the storage roll 104. Alternatively, the sheet of gaseous metal coated wire metal, as withdrawn from the gaseous metal plating chamber 99, is passed to an electrolytic plating bath 106, as shown in dotted lines at 107, the plating bath 106 being arranged to electrolytically plate aluminum metal onto the metal coated wire or strip as the same passes through the bath. The finished aluminum plated wire is then rolled up on the storage roll 110.

A metal sheet or the like produced as shown by Figure 3 is illustrated by the fragmentary sectional view on an enlarged scale in Figure 6. Aluminum metal 112 is tenaceously bonded to the steel base 113 through an intermediate gaseous metal deposited tooth-forming metal layer 114.

In the production of aluminum wire, such as employed for electrical conductor purposes, which is desired to have a tinned outer surface for soldering purposes, aluminum wire is used in place of iron or steel wire. The aluminum wire is then subjected to gaseous metal plating to deposit an intermediate metal bonding layer such as copper, nickel, iron or alloy thereof, and preferably nickel. Thereafter the thus coated aluminum wire is electroplated with tin or dipped in a bath of molten tin to coat the wire. The intermediate coating of nickel metal makes it possible to bond the tin satisfactorily to the aluminum wire surface. The metal as deposited by gaseous metal deposition is preferably on the order of 0.0001 to 0.0008 inch in thickness.

Utilizing gaseous metal plating to provide the intermediate bonding metal layer on the base metal, aluminized steel or tinned aluminum composite sheet or wire may be produced having improved ductility and toughness as compared to ordinary aluminum-metal composites. The gaseous metal plating coating, being relatively porous, forms a tooth-like coating for the reception of aluminum metal, thus providing an intermediate metal layer having enhanced bonding properties.

The invention, therefore, broadly comprises a method for forming composite aluminum-metal products wherein aluminum is bonded to steel, tin or a like metal, which, ordinarily, does not form a satisfactory composite product with aluminum metal. Employing a gaseous metal deposited intermediate metal layer for uniting the aluminum metal with steel or tin metal, improved adherence of the metals is provided. Further, the invention makes it possible to speed up the process of manufacture of composite aluminum-metal products.

The application of aluminum may be made by either conventional electro-plating methods or by utilizing a molten bath of aluminum. Similarly, in the production of tinned aluminum, the tin may be applied by electrolysis or by dipping the gaseous metal plated aluminum in a molten bath of tin, the gaseous metal plated intermediate layer providing a toothed bonding surface for the reception of the tin metal coating.

Utilization of gaseous metal plating to apply an intermediate bonding coating or layer of metal in accordance with the process of this invention makes it possible to produce continuous lengths of composite aluminum metal wire, strips or sheet, as desired, at a high rate of speed inasmuch as the intermediate bonded layer of metal may be deposited on the metal strip while the same is being moved along at a high rate of speed. A flash coating of bonding metal, such as iron, copper, nickel or tin or alloys thereof, may be deposited by gaseous metal deposition in a manner of a few seconds to thus provide a tenaceous intermediate metal layer for the reception of aluminum metal, as in the case of making aluminized steel or the like composite product.

The invention, thus, provides an improved method of bonding aluminum to steel, tin or the like metal efficiently and avoids the production of an intermediate alloy at the interfacial surfaces of the two metals which is brittle and non-adherent.

In the gaseous metal plating for the production of the intermediate metal layer for bonding aluminum to steel, tin or the like, metals may be introduced as gaseous metal carbonyls or vaporized solutions of certain of the metal carbonyls in readily vaporizable solvents (for example, petroleum ether) also nitroxyl compounds, nitrosyl carbonyls, metal hydrides, metal alkyls, metal halides and the like.

Illustrative compounds of the carbonyl type are nickel, iron, chromium, molybdenum, cobalt and mixed carbonyls.

Illustrative compounds of other groups are the nitroxyls, such as copper nitroxyl; nitrosyl carbonyls, for example, cobalt nitrosyl carbonyl, hydrides, such as antimony hydride, tin hydride; metal alkyls, such as chromyl chloride; and carbonyl halogens, for example, osmium carbonyl bromide, ruthenium carbonyl chloride, and the like. The acetylacetonates of these metals or hydrides may also be used in place of the carbonyls.

Each material from which a metal may be plated has a temperature at which decomposition is complete. However, decomposition may take place slowly at a lower temperature or while the vapors are being raised in temperature through some particular range. For example, nickel carbonyl completely decomposes at a temperature in the range of 375° F. to 400° F. However, nickel carbonyl starts to decompose slowly at about 175° F. and, therefore, decomposition continues during the time of heating from 200° to 380° F. A large number of the metal carbonyls and hydrides may be effectively and efficiently decomposed at a temperature in the range of 350° F. to 450° F. When working with most metal carbonyls we prefer to operate in a temperature range of 375° F. to 425° F.

Heating of the metal preparatory to plating is preferably carried out under non-oxidizing conditions and may be effected using radiant heating, electrical resistance heating, induction heating or the like.

Decomposition of the gaseous metal compound for plating may be accomplished by mixing the metal compound with hot inert gas, e.g. carbon dioxide, concurrently while bringing the gaseous mixture in contact with the metal surface to be plated. Even a fine spray of liquid can be transformed from a liquid at a temperature of 100° F. to a vapor having a temperature of 325° F. in a fraction of a second, and the vapors decomposed by being brought into contact with a heated surface having a higher temperature, as aforementioned.

While the invention is illustrated and described in its preferred embodiments, it will be understood that modifications and variations may be effected without departing from the scope of the novel concepts of this invention and as set forth in the appended claims.

I claim:

1. A method of bonding aluminum metal to the surface of tin metal to which aluminum metal does not firmly adhere, said method consisting in cleaning said tin metal surface, heating the cleaned tin metal, and contacting the same while heated with a gaseous heat-decomposable metal bearing compound of a metal selected from the group consisting of nickel, iron, chromium and copper, the temperature of said tin metal surface being high enough to cause decomposition of said metal bearing compound and deposition of a metal layer on said tin metal to provide an intermediate metal layer to which aluminum metal bonds, and thereafter gas plating aluminum metal on said intermediate metal layer to produce a composite metal body.

2. A method of bonding aluminum metal to tin metal to which aluminum metal does not firmly adhere, said method consisting in cleaning said tin metal surface, heating the cleaned tin metal and contacting the same while heated with a gaseous heat-decomposable metal bearing compound of a metal selected from the group consisting of nickel, iron, chromium, and copper, the temperature of said tin metal surface being high enough to cause thermal decomposition of said metal bearing compound and deposition of a metal layer thereon to provide an intermediate metal layer to which aluminum metal bonds, and thereafter gas plating aluminum metal on said intermediate metal layer to produce a composite metal body, said intermediate metal layer being deposited to a thickness of between 0.0001 to 0.0008 inch.

References Cited in the file of this patent
UNITED STATES PATENTS

| Number | Name | Date |
|---|---|---|
| 1,381,085 | Dantsizen | June 7, 1921 |
| 1,637,033 | Basch | July 26, 1927 |
| 1,761,850 | Smith | June 3, 1930 |
| 1,816,388 | Mittasch | July 28, 1931 |
| 1,816,476 | Fink | July 28, 1931 |
| 2,300,400 | Axline | Nov. 3, 1942 |
| 2,303,869 | Quinlan | Dec. 1, 1942 |
| 2,473,888 | Jordan | June 21, 1949 |
| 2,484,118 | Reynolds | Oct. 11, 1949 |
| 2,490,543 | Robertson | Dec. 6, 1949 |
| 2,490,549 | Schultz | Dec. 6, 1949 |
| 2,509,117 | Wallace | May 23, 1950 |
| 2,619,433 | Davis | Nov. 25, 1952 |
| 2,653,879 | Fink | Sept. 29, 1953 |
| 2,683,305 | Goetzel | July 13, 1954 |
| 2,752,667 | Schaefer | July 3, 1956 |
| 2,766,195 | Combs | Oct. 9, 1956 |
| 2,772,985 | Wainer | Dec. 4, 1956 |